(12) United States Patent
Brookes et al.

(10) Patent No.: US 6,260,860 B1
(45) Date of Patent: Jul. 17, 2001

(54) VEHICLE SUSPENSIONS

(75) Inventors: Graham Robert Brookes, Reditch; Richard Graham Woodhouse, Hall Green; Christopher David Dixon, Saltburn-by-Sea, all of (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/535,324

(22) Filed: Mar. 27, 2000

(30) Foreign Application Priority Data

Apr. 1, 1999 (GB) ................................. 9907537

(51) Int. Cl.$^7$ .................................. B60G 17/00
(52) U.S. Cl. .................. 280/6.157; 180/209; 280/5.514; 280/6.15
(58) Field of Search .............. 280/124.134, 5.5, 280/5.514, 6.15, 6.157, 6.158, 124.157, 124.159, 124.16; 180/FOR 209

(56) References Cited

U.S. PATENT DOCUMENTS 5,180,024  1/1993  Eto .

FOREIGN PATENT DOCUMENTS

| 2292916A | 3/1996 | (GB) . | |
|---|---|---|---|
| 3-178816 | * 8/1991 | (JP) | ............... 280/FOR 161 |
| 3-178819 | * 8/1991 | (JP) | ............... 280/FOR 161 |

* cited by examiner

*Primary Examiner*—Eric Culbreth
(74) *Attorney, Agent, or Firm*—Davis & Bujold, P.L.L.C.

(57) ABSTRACT

An independent vehicle suspension in which the height change which can be made while the vehicle is stationary is limited so as to prevent the system from having to make too great an associated track change. This prevents the system from becoming locked during a height change due to stiction between the wheels and ground which opposes the track change. The height change is completed when the vehicle is detected as starting to move.

14 Claims, 2 Drawing Sheets

VEHICLE SUSPENSIONS

FIELD OF THE INVENTION

The present invention relates to active vehicle suspensions which are operable to alter the ride height of a vehicle, and in particular to such suspensions which are independent suspensions.

BACKGROUND TO THE INVENTION

In most independent suspensions a change of ride height is accompanied by a change of track because the wheels are attached to suspension arms which pivot, usually about their inboard end, as the body is raised or lowered. The wheels therefore move relative to the body in an arc rather than a straight line. If the vehicle is stationary when the height change is occurring, the friction between the wheels and the ground can prevent the wheels from slipping sideways and therefore prevent or hinder the change of height. This can result in the vehicle becoming stuck at a ride height which is different from the desired ride height. A lot of energy can then be expended as the system tries to overcome friction, especially if the ride height is increasing. Also, when the vehicle starts to move the ride height, and track, can change with much less resistance, and this can lead to a sudden height change which is uncomfortable or disconcerting for the driver.

SUMMARY OF THE INVENTION

Accordingly the present invention provides an independent vehicle suspension system for connecting two wheels to opposite sides of a vehicle body, the system comprising two suspension arms each for connecting a respective one of the wheels to the body and being movable relative to the body so as to provide a variable ride height of the body relative to the respective wheel, two ride height control actuators each for changing the ride height of the vehicle body relative to one of the wheels, a controller arranged to receive ride height change request signals and to control the operation of the ride height control actuators, and a vehicle speed sensor for measuring a ground speed of the vehicle wherein, upon receipt of a ride height change request signal, the controller is arranged to send signals to the ride height control actuators to start the ride height change and, if the vehicle is stationary, at least under some conditions, to cease the ride height change before it has been completed, and if the vehicle ceases to be stationary, to complete the requested ride height change.

The control means may define a predetermined maximum ride height change and said conditions be that the requested ride height change is more than the maximum ride height change.

Alternatively the system may further comprise ride height sensors for detecting said conditions which are when the ride height does not change in the requested manner in response to receipt of a ride height change request signal.

Preferably the control means has defined therein a predetermined magnitude of rate of change of ride height, and is arranged to monitor the rate of change of ride height during the requested ride height change, and to detect said conditions by detecting that the rate of change with time falls below said predetermined magnitude.

Preferably the ride height control actuators are operated by a fluid, the system further comprises pressure sensors for measuring the pressure of the fluid, and the control means is arranged to monitor the pressure of the fluid and the ride height during the requested ride height change and to detect said conditions by detecting that the ride height does not vary in an expected manner with change in said pressure.

The fluid is preferably air, but hydraulically actuated systems can also be used.

The ride height change may be an increase or a decrease in ride height.

The suspension arms are preferably arranged such that a change of ride height of the wheels produces a change of track of the wheels. For example the suspension arms may be arranged to pivot relative to the body about respective axes which extend substantially longitudinally of the vehicle.

preferably the system further comprises wheel speed sensors for detecting whether the vehicle is stationary.

The present invention further provides an independent vehicle suspension system for connecting two wheels to opposite sides of a vehicle body, the system comprising two suspension arms each for connecting a respective one of the wheels to the body and being movable relative to the body so as to provide a variable ride height of the body relative to the respective wheel, two ride height control means each for changing the ride height of the vehicle body relative to one of the wheels, control means arranged to receive ride height change request signals and to control the operation of the ride height control means, and a vehicle speed measuring means for measuring a ground speed of the vehicle wherein, upon receipt of a ride height change request signal, the control means is arranged to send signals to the ride height control means to start the ride height change and, if the vehicle is stationary, at least under some conditions, to cease the ride height change before it has been completed, and if the vehicle ceases to be stationary, to complete the requested ride height change.

The present invention further provides an independent vehicle suspension system for connecting two wheels to opposite sides of a vehicle body, the system comprising two suspension arms each for connecting a respective one of the wheels to the body and being movable relative to the body so as to provide a variable ride height of the body relative to the respective wheel, two ride height control actuators each for changing the ride height of the vehicle body relative to one of the wheels, a controller arranged to receive ride height change request signals and to control the operation of the ride height control actuators, and a vehicle speed sensor for measuring a ground speed of the vehicle wherein, upon receipt of a ride height change request signal, the controller is arranged to send signals to the ride height control actuators to start the ride height change and, if the vehicle is stationary, to monitor the ride height during the ride height change and, if it does not change in an expected manner, to cease the ride height change before it has been completed, and if the vehicle ceases to be stationary, to complete the requested ride height change.

The present invention still further provides an independent vehicle suspension system for connecting two wheels to opposite sides of a vehicle body, the system comprising two suspension arms each for connecting a respective one of the wheels to the body and being movable relative to the body so as to provide a variable ride height of the body relative to the respective wheel, two ride height control actuators each for changing the ride height of the vehicle body relative to one of the wheels, a controller arranged to receive ride height change request signals and to control the operation of the ride height control actuators, and a vehicle speed sensor for measuring a ground speed of the vehicle wherein, upon receipt of a ride height change request signal, the controller is arranged to send signals to the ride height control actuators to start the ride height change and, if the vehicle is stationary and the requested ride height change exceeds a predetermined maximum ride height change, to change the ride height only by said predetermined maximum change, and then if the vehicle ceases to be stationary, to complete the requested ride height change.

Preferred embodiments of the present invention will now be described by way of example only with reference to the accompanying drawings.

DETAILED DESCRIPTION OF THE PREFERRED EMBODIMENTS

Figure 1:
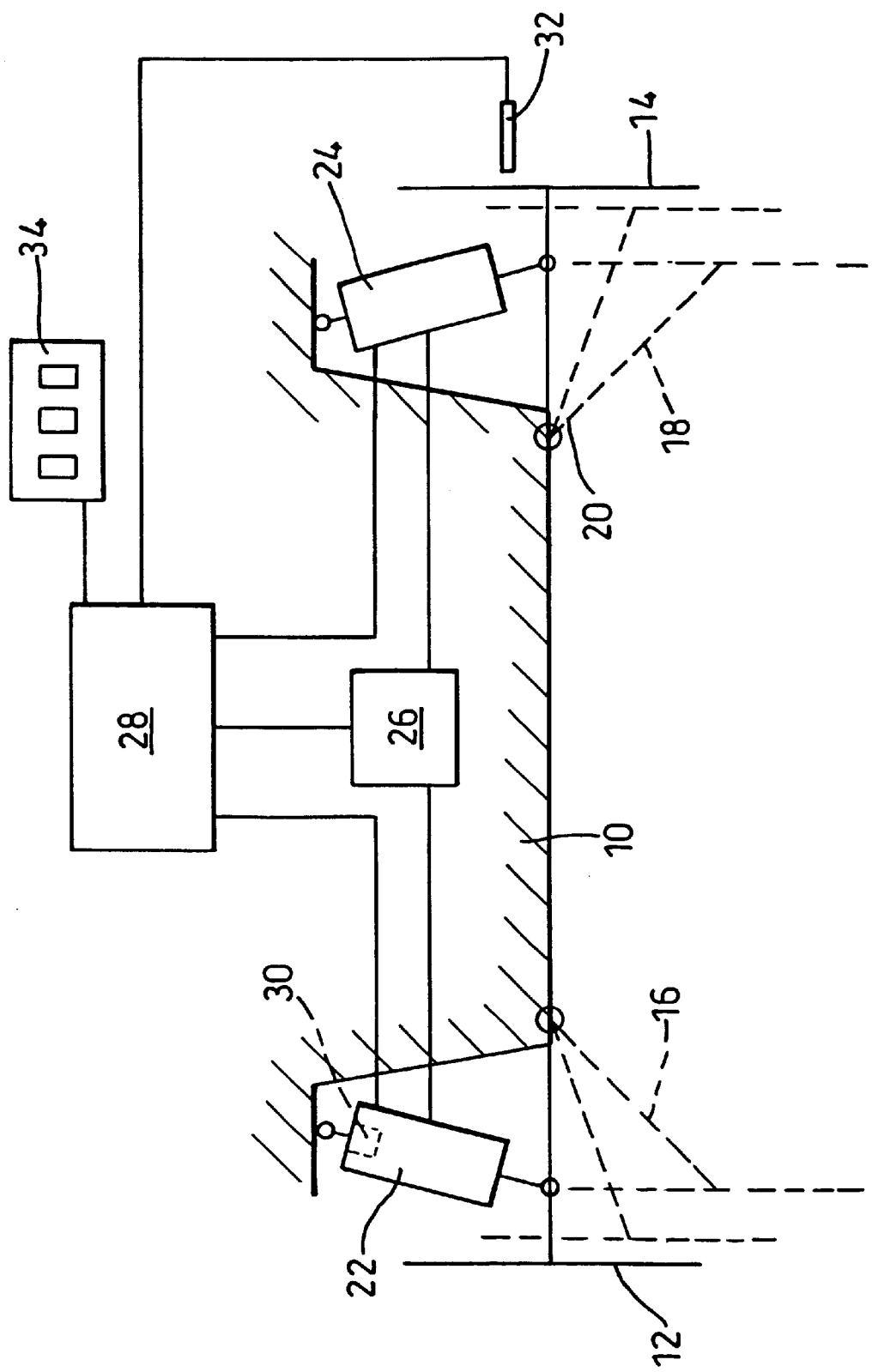
FIG. 1 is a diagrammatic representation of a vehicle including a suspension according to the invention.

Referring to FIG. 1 a vehicle comprises a body 10 having two front wheels (not shown) and two rear wheels 12, 14 connected to it by an independent suspension system. The suspension system for the rear wheels includes suspension arms 16, 18 each of which is pivoted at its inboard end 20 to the vehicle body 10 and has a respective one of the wheels 12, 14 mounted on its outboard end in conventional manner. The ride height of the body 10 relative to each of the wheels 12, 14 is controlled by a respective air actuated suspension unit 22, 24. The flow of air to and from the suspension units is controlled by a valve block 26 which in turn is controlled by an electronic control unit 28. The control unit 28 receives input signals from, among other things, ride height sensors 30 which are mounted on the suspension units and enable it to measure the ride height of the body at each of the wheels, and wheel speed sensors 32 which allow it to measure the rotational speed of the wheels 12, 14, and hence vehicle speed. It also receives a ride height selection signal from a ride height selection switch panel 34 which is situated in the passenger compartment of the vehicle for operation by the driver.

In this embodiment the suspension system has three selectable ride heights: access, which is the lowest and is shown in solid lines; on-road, which is the next highest and is shown in dotted lines; and off-road which is the highest and is also shown in dotted lines. Each of these selectable ride heights is an average of the ride heights at the two wheel 12, 14, i.e. a selected ride height is deemed to have been reached when the average ride height at the two wheels 12, 14 reaches the selected ride height. Obviously in a vehicle with active suspension at all four wheels the average ride height at the front and the average ride height at the rear can be controlled in a co-ordinated manner so as to keep the vehicle level and give a desired average ride height for the whole vehicle. Because the suspension arms 16 18 pivot about an axis which is substantially longitudinal of the vehicle, the suspension is of the type in which any change in ride height is accompanied by a change in track, that is a change in the distance between the centres of the respective contact patches between the wheels 12, 14 and the ground. As can be seen in FIG. 1, as the ride height increases the wheels 12, 14 move closer together and so the track at the rear of the vehicle decreases.

Figure 2:
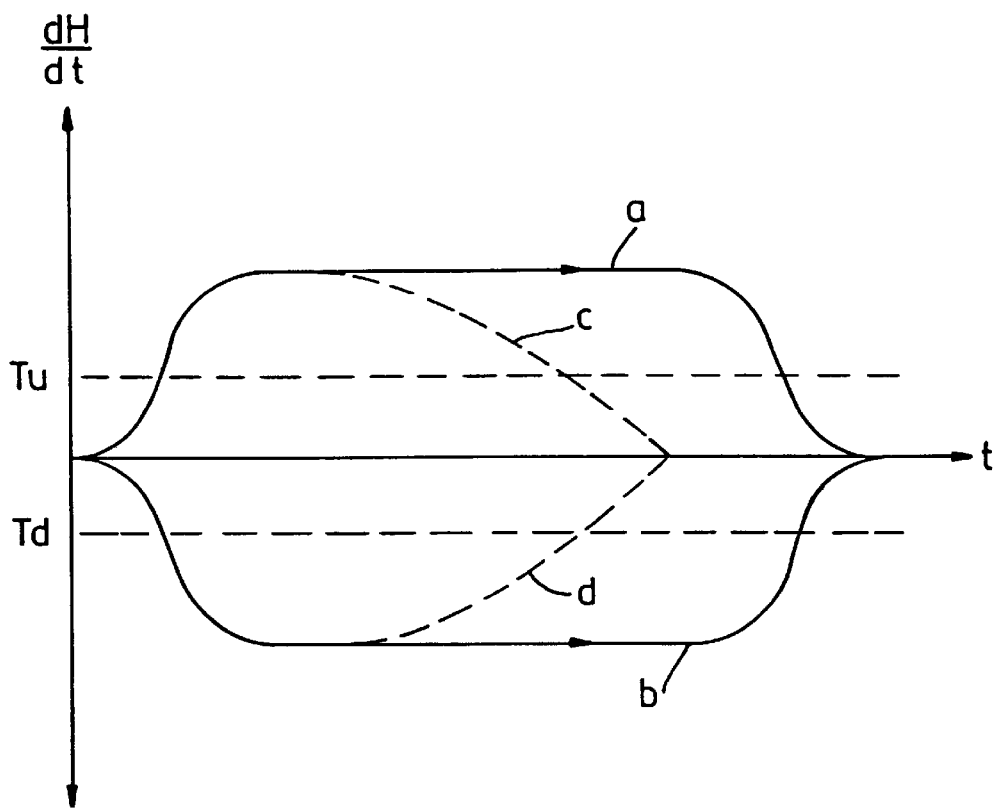
FIG. 2 is a graph of rate of change of ride height as a function of time showing one mode of operation of the system of FIG. 1.

Referring to FIG. 2, the expected rate of change of ride height with time when the control unit 28 operates the valve block 26 so as to produce an increase in ride height in response to its receipt from the ride height control switch panel 34 of a ride height increase request signal, for example from the off-road ride height to the on-road ride height, is shown by line a. The rate of change of ride height increases up to a maximum, stays at that maximum for a certain time, and then falls off again as the new ride height is reached. On a decrease of ride height, the expected rate of change of height is shown by line b, which mirrors line a because the ride height varies in the same way except that it decreases, so the rate of change is negative.

If there is some resistance to the change of ride height, for example if the vehicle is stationary on a high friction surface, the rate of change of ride height will initially be unaffected, because the tyres and the compliance in the suspension system will allow some change in ride height without significant track change, but as the lateral forces build up in the suspension, the change in ride height will fall off, for example as shown by the line c for increasing ride height and line d for decreasing ride height. In order to monitor for the occurrence of this 'stiction' condition, the control unit is arranged to monitor the rate of change of ride height during the change, and the speed of the vehicle. If while the vehicle is stationary, after the initial build up of the rate of change, and before the controlled decrease in rate of change as the new ride height is approached, the ride height does not change in the expected manner, and in particular if the rate of change falls in magnitude below a threshold level $T_u$ for an upward height change and $T_d$ for a downward height change, then the control unit assumes that friction between the wheels and the surface on which the vehicle is situated is preventing the change in ride height and sends signals to the valve block to stop the change in ride height. The ride height is therefore maintained at the height at which the stiction condition was detected for as long as the vehicle remains stationary, or until a request for a return to the original ride height is received from the ride height control switch panel 34. If the control unit 28 detects by means of the wheel speed detectors 32 that the vehicle starts to move, i.e. to have a ground speed which is. non-zero or above a pre-determined level, then it sends further signals to the valve block 26 requesting the change to the new ride height to continue. The height change will therefore re-commence and, provided the stiction condition does not re-occur, and no other problems arise, the ride height will be altered to the new level. If, after the height change has been stopped on detection of the stiction condition a request for a return to the original ride height is received, that request will be acted upon provided the stiction condition does not re-occur on the return to the original height. This is because, assuming that no lateral movement of the wheels has occurred, the stiction effect should not hinder the return.

If the requested height change was a decrease in height, then the stiction condition is represented by the dotted curve d in FIG. 2 and is detected by the rate of change of height falling in magnitude below the threshold level $T_d$. The response of the control unit is the same as described above for the increasing ride height.

Figure 3:
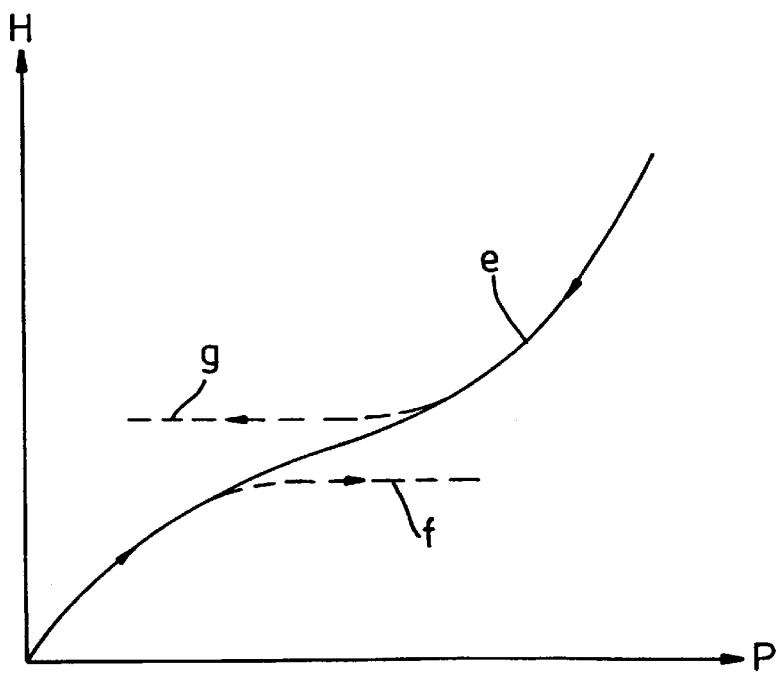
FIG. 3 is a graph of ride height as a function of pressure showing another mode of operation of the system of FIG. 1.

Referring to FIG. 3, in a second embodiment of the invention, the hardware is essentially the same as described above with reference to FIG. 1. However the method of detection of the stiction condition is different. In this case the air pressure in the suspension units is monitored using an air pressure sensor and the control unit monitors the changes in air pressure and ride height as the ride height changes. The expected relationship is as shown in the solid line e in FIG. 3, the air pressure increasing with ride height. This is due to many factors including the shape of the piston in the suspension unit which, in this embodiment, results in a decrease in effective cross sectional area of the piston as the ride height increases, and therefore an increase in air pressure. In the event of the change in ride height being hindered by the stiction condition described above, the pressure will change as air continues to be pumped into or vented out of the air spring. However, the change in height will gradually reduce and will eventually cease, as shown in the dotted lines f for an increase in ride height and g for a decrease. The control unit is therefore arranged to monitor for any significant departure of the system from the solid curve e during a change of ride height. If this occurs when the vehicle is stationary, then the stiction condition is considered to have occurred, and the change in ride height is stopped. As in the first embodiment, the ride height change is resumed if the vehicle starts to move, at least above a predetermined speed, and is reversed if so requested by the driver even if the vehicle remains stationary, provided the stiction condition does not re-occur.

In a further embodiment of the invention the control unit does not monitor the change of height of the vehicle, but simply limits the vertical height change to a predetermined maximum if the vehicle is stationary. Then, if a height change greater than the maximum is requested while the vehicle is stationary the control unit changes the height by the predetermined maximum amount and then stops, but as soon as the vehicle is detected, by means of the wheel speed sensors, as starting to move the requested height change is completed. In the system shown in FIG. 1 this might occur in particular if a height change from the access level straight to the off-road height were requested. The maximum amount by which the ride height can change while the vehicle is stationary is determined for a particular vehicle as that which can be accommodated by the compliance in the suspension and tyres when the vehicle is on a high friction surface without significant resistance building up.

We claim:

1. An independent vehicle suspension system for connecting two wheels to opposite sides of a vehicle body, the system comprising two suspension arms each for connecting a respective one of the wheels to the body and being movable relative to the body so as to provide a variable ride height of the body relative to the respective wheel, two ride height control actuators each for changing the ride height of the vehicle body relative to one of the wheels, a controller arranged to receive ride height change request signals and to control the operation of the ride height control actuators, and a vehicle speed sensor for measuring a ground speed of the vehicle wherein, upon receipt of a ride height change request signal, the controller is arranged to send signals to the ride height control actuators to start the ride height change and, if the vehicle is stationary, at least under some conditions, to cease the ride height change before it has been completed, and if the vehicle ceases to be stationary, to complete the requested ride height change.

2. A system according to claim 1 wherein the controller defines a predetermined maximum ride height change and said conditions are that the requested ride height change is more than the maximum ride height change.

3. A system according to claim 1 further comprising ride height sensors for detecting said conditions which are when the ride height does not change in the requested manner in response to receipt of a ride height change request signal.

4. A system according to claim 3 wherein the controller has defined therein a predetermined magnitude of rate of change of ride height, and is arranged to monitor the rate of change of ride height during the requested ride height change, and to detect said conditions by detecting that the rate of change with time falls below said predetermined magnitude.

5. A system according to claim 3 wherein the ride height control actuators are operated by a fluid, the system further comprises pressure sensors for measuring the pressure of the fluid, and the controller is arranged to monitor the pressure of the fluid and the ride height during the requested ride height change and to detect said conditions by detecting that the ride height does not vary in an expected manner with change in said pressure.

6. A system according to claim 5 wherein the fluid is air.

7. A system according to claim 1 wherein the ride height change is an increase in ride height.

8. A system according to claim 1 wherein the ride height change is a decrease in ride height.

9. A system according to claim 1 wherein the suspension arms are arranged such that a change of ride height of the wheels produces a change of track of the wheels.

10. A system according to claim 1 wherein the suspension arms are arranged to pivot relative to the body about respective axes which extend substantially longitudinally of the vehicle.

11. A system according to claim 1 further comprising wheel speed sensors for detecting whether the vehicle is stationary.

12. An independent vehicle suspension system for connecting two wheels to opposite sides of a vehicle body, the system comprising two suspension arms each for connecting a respective one of the wheels to the body and being movable relative to the body so as to provide a variable ride height of the body relative to the respective wheel, two ride height control means each for changing the ride height of the vehicle body relative to one of the wheels, control means arranged to receive ride height change request signals and to control the operation of the ride height control means, and a vehicle speed measuring means for measuring a ground speed of the vehicle wherein, upon receipt of a ride height change request signal, the control means is arranged to send signals to the ride height control means to start the ride height change and, if the vehicle is stationary, at least under some conditions, to cease the ride height change before it has been completed, and if the vehicle ceases to be stationary, to complete the requested ride height change.

13. An independent vehicle suspension system for connecting two wheels to opposite sides of a vehicle body, the system comprising two suspension arms each for connecting a respective one of the wheels to the body and being movable relative to the body so as to provide a variable ride height of the body relative to the respective wheel, two ride height control actuators each for changing the ride height of the vehicle body relative to one of the wheels, a controller arranged to receive ride height change request signals and to control the operation of the ride height control actuators, and a vehicle speed sensor for measuring a ground speed of the vehicle wherein, upon receipt of a ride height change request signal, the controller is arranged to send signals to the ride height control actuators to start the ride height change and, if the vehicle is stationary, to monitor the ride height during the ride height change and, if it does not change in an expected manner, to cease the ride height change before it has been completed, and if the vehicle ceases to be stationary, to complete the requested ride height change.

14. An independent vehicle suspension system for connecting two wheels to opposite sides of a vehicle body, the system comprising two suspension arms each for connecting a respective one of the wheels to the body and being movable relative to the body so as to provide a variable ride height of the body relative to the respective wheel, two ride height control actuators each for changing the ride height of the vehicle body relative to one of the wheels, a controller arranged to receive ride height change request signals and to control the operation of the ride height control actuators, and a vehicle speed sensor for measuring a ground speed of the vehicle wherein, upon receipt of a ride height change request signal, the controller is arranged to send signals to the ride height control actuators to start the ride height change and, if the vehicle is stationary and the requested ride height change exceeds a predetermined maximum ride height change, to change the ride height only by said predetermined maximum change, and then if the vehicle ceases to be stationary, to complete the requested ride height change.

* * * * *